United States Patent [19]

Krizman

[11] Patent Number: 4,593,520

[45] Date of Patent: Jun. 10, 1986

[54] RAKE HEAD FOR A RAKING IMPLEMENT

[76] Inventor: Andrew J. Krizman, 5434 S. Raleigh Dr., South Bend, Ind. 46614

[21] Appl. No.: 698,610

[22] Filed: Feb. 6, 1985

[51] Int. Cl.$^4$ .............................................. A01D 7/00
[52] U.S. Cl. ................................ 56/400.06; 56/400.01
[58] Field of Search ........... 56/400.01, 400.04, 400.05, 56/400.06, 400.21; 172/375; 403/248, 250, 251, 260, 263

[56] References Cited

U.S. PATENT DOCUMENTS

| | | | |
|---|---|---|---|
| 274,118 | 6/1984 | Cochrane | D8/13 |
| 406,899 | 7/1889 | Hall, Jr. | 403/248 |
| 1,115,881 | 11/1914 | West | 56/400.04 |
| 1,146,287 | 7/1915 | Shaw | 56/400.06 |
| 1,780,748 | 11/1930 | Fisher | 56/400.21 |
| 2,109,488 | 3/1938 | Wegner | 56/400.05 |
| 3,164,213 | 1/1965 | Lutz | 172/375 |
| 3,440,810 | 4/1969 | Rhyme | 56/400.01 |
| 3,654,754 | 4/1972 | Scoggin, Jr. et al. | 56/400.01 |
| 3,707,835 | 1/1973 | McNally et al. | 56/400.01 |
| 3,719,376 | 3/1973 | Johnson | 403/263 |
| 3,818,688 | 6/1974 | Drummond et al. | 56/400.01 |
| 4,078,368 | 3/1978 | Binder | 56/400.01 |
| 4,102,405 | 7/1978 | Carman | 172/378 |
| 4,224,786 | 9/1980 | Langlie et al. | 56/400.01 |
| 4,289,344 | 9/1981 | Mitchell | 294/2 |
| 4,433,931 | 2/1984 | Malish et al. | 403/263 |

Primary Examiner—Gene Mancene
Assistant Examiner—David I. Tarnoff
Attorney, Agent, or Firm—Barnes & Thornburg

[57] ABSTRACT

A raking implement, which is especially well-suited for use as a sand trap rake, comprises a rake head which is formed from a resilient, elastomeric material. A plurality of tines extending from the crosshead are integrally formed from the same resilient, elastomeric material. A stiffener, which is also formed of a resilient elastomeric such as nylon, is embedded within the crosshead to increase the rigidity along a transverse axis. The rake head is attached to a hollow handle by means of an integrally molded socket, a threaded bolt and a wedge nut.

28 Claims, 4 Drawing Figures

RAKE HEAD FOR A RAKING IMPLEMENT

BACKGROUND AND SUMMARY OF THE INVENTION

The present invention relates to a rake head for a raking implement which is especially well-suited for raking and smoothing loose, granular materials.

Sand trap rakes are used by golfers and greenskeepers to smooth out foot prints and signs of play in the sand of bunkers on a golf course. These rakes are usually made of wood or plastic, and are often left on the course in the vicinity of a bunker for use by all golfers. After prolonged exposure to the sun and to temperature extremes, the wooden rakes tend to come unglued and to deteriorate, and the plastic rakes become brittle. In addition, both types of rakes are subject to breaking as a result of being thrown, over-stressed, run over by golf carts or mowing machines, or otherwise abused.

An object of the present invention is to provide a rake head for a raking implement, suitable for use as a sand trap rake, which is extremely durable and weather resistant.

Another object of the present invention is to provide a rake head for a raking implement which is very light weight and easy to use.

Yet another object of the present invention is to provide a raking implement which incorporates new and improved safety features in its design.

These and other objects are attained in a raking implement which includes a rake head comprising a crosshead formed from a resilient, elastomeric material, a plurality of tines extending from the crosshead, and a stiffener for increasing the rigidity of the resilient crosshead along its transverse axis or width. The tines are integrally formed with the crosshead from the resilient, elastomeric material. In a preferred embodiment, the tines are evenly spaced along a common edge of the crosshead and at least a portion of each tine is generally circular in cross-section. The cross-sectional diameter and the length of the circular portion determine the degree of resilience of each tine. The preferred embodiment of the crosshead also includes a blade-shaped edge extending along the crosshead. The blade-shaped edge is integrally formed with the crosshead from the resilient, elastomeric material. The blade edge can be used for smoothing or moving large amounts of material to, for example, fill a hole. The blade-shaped edge is similar in design to a squeegee and can be used to clear water from puddles on the green, or in other areas, in the same manner in which a squeegee is used to scrap water from flat surfaces.

The resilient, elastomeric material may be a material such as neoprene, which is a synthetic rubber produced by the polymerization of a chlorine derivative of acetylene. However, preferred materials include polymers of ethylene and especially copolymers of ethylene and propylene. An especially preferred material is an EPDM rubber compound having a Durometer hardness of approximately 80 and a tensile rating of approximately 1500 PSI (pounds per square inch).

The stiffener for the crosshead is preferably embedded within the resilient material of the crosshead. In a preferred embodiment, the stiffener is an insert which is also made of an elastomeric material. The melting point of the elastomeric insert is selected to be above that of the resilient elastomeric material which forms the crosshead. In an especially preferred embodiment, the elastomeric insert is made of heat-stabilized nylon.

The raking implement of the present invention includes a handle and hardware for attaching the handle to the crosshead. The handle is preferably a hollow tube formed of a non-metallic material. Although a tubular handle formed from a light-weight metal (such as aluminum) can be used to practice the present invention, the use of a non-metal handle is preferred to provide the safety features discussed below. An especially preferred non-metallic material is fiberglass. Other types of resin or plastic handles may be used as well.

The hardware for attaching the handle to the crosshead preferably includes a socket which is integrally formed with the resilient crosshead. The socket is hollow and cylindrically shaped for insertion into a hollow end of the handle. A threaded bolt and a wedge nut are provided for expanding the socket against the inner wall surface of the handle. In an especially preferred embodiment, the socket extends from the crosshead at an angle $\alpha$, as measured in a counter-clockwise direction from a centerline of the tines, and at an angle $\beta$, as measured from a clockwise direction from the blade-shaped edge. Both $\alpha$ and $\beta$ are preferably greater than 90° to provide for additional advantages, as discussed below.

The materials from which the rake and rake head are formed are resistant to heat, light, temperature extremes, moisture and other environmental conditions. The resilience of the crosshead and of the individual tines prevents breakage due to impact, over stressing and other forms of abuse. The embedded stiffener and the provision of a plurality of individual tines assures enough rigidity in the assembly to adequately rake and smooth sand and other granular materials. The light-weight construction allows for fine raking with little exertion on the part of the user.

The non-metal construction of the preferred embodiment of the rake is especially important relative to several safety features. First, the non-metal embodiment of the rake will not attract lightning (which is an all-too-common golf course hazard) to the body of the user. Second, the relatively blunt and resilient nature of the tines prevents injuries which might otherwise result from stepping or falling on the rake. Third, the non-metallic materials of the rake reduce damage to equipment and possible injury to personnel which might otherwise result from inadvertently running over the rake with grass cutting equipment, golf carts, or other vehicles. Furthermore, the handle socket extends from the crosshead, as noted above, at angles $\alpha$ and $\beta$ with respect to the resilient tines and the blade-shaped edge. When $\alpha$ and $\beta$ are both greater than 90°, this configuration prevents the handle of the rake from flying into the face of a person who inadvertently steps on the upturned tines of a rake which is lying on the ground. This results from the fact that when the tines are facing in an upward, vertical position, the blade-shaped edge is pointing downward and away from the handle. Thus, when the crosshead is stepped on, the blade-shaped edge tends to oppose movement of the handle.

It should be noted that, while the rake of the present invention is particularly well suited for use as a sand trap rake, there are other situations in which many of these advantages and improved features would be applicable as well. For example, the moving, raking and/or smoothing of bulk granular materials such as grain, styrofoam beads, etc., can be accomplished with the rake of the present invention.

Other objects, advantages and novel features of the present invention will become apparent from the following detailed description of a preferred embodiment of the invention, when considered in conjunction with the accompanying drawings.

BRIEF DESCRIPTION OF THE DRAWINGS

FIG. 3 shows a cross-sectional view along section line AA of the rake head of FIG. 2.

FIG. 4 shows an exploded sectional view of the rake head of FIG. 2 taken along section line BB.

DETAILED DESCRIPTION OF THE DRAWINGS

Figure 1:
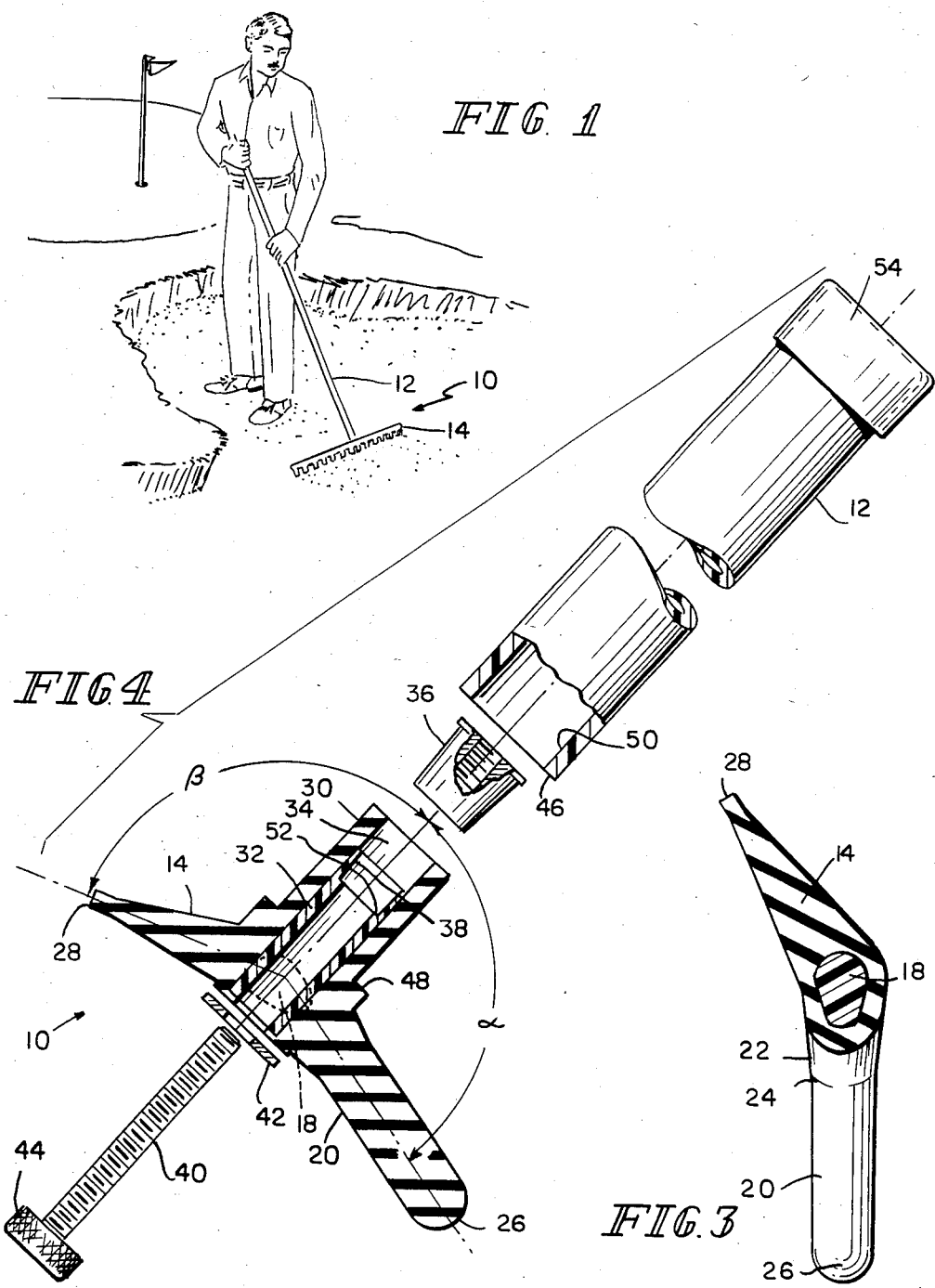
FIG. 1 shows a perspective view of the rake of the present invention being used to groom a sandtrap.

FIG. 1 shows a perspective view of the rake of the present invention in a preferred embodiment which is especially well-suited for use as a sand trap rake. This preferred embodiment of the rake, which is indicated generally by reference numeral 10, comprises a handle portion 12 and a non-metallic crosshead 14. The details of crosshead 14 and the method of attaching crosshead 14 to handle portion 12 are discussed below and illustrated in FIGS. 2 through 4.

Figure 2:
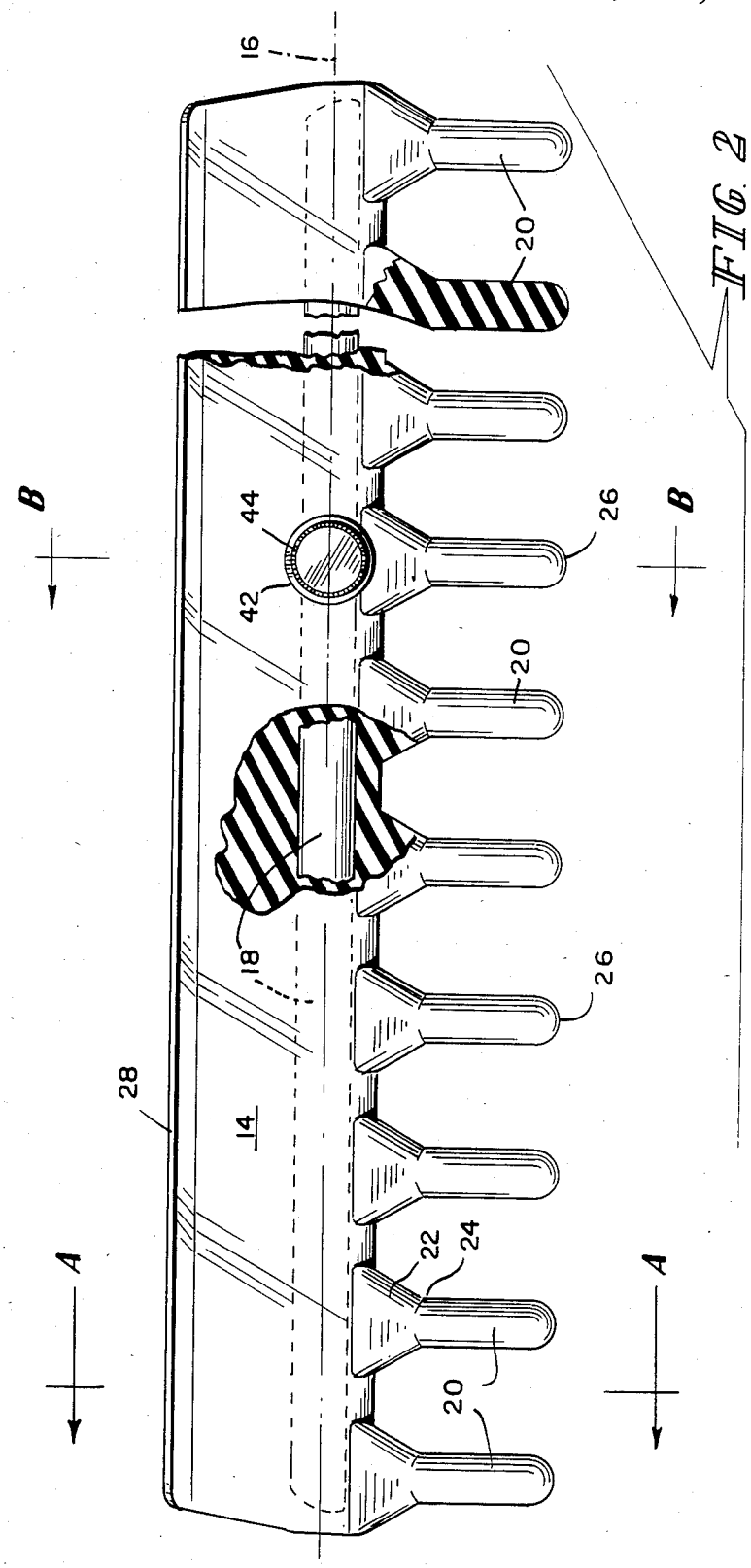
FIG. 2 shows a frontal view of the rake head of the present invention.

FIG. 2 shows a frontal view of crosshead 14. Crosshead 14 is formed from a resilient, elastomeric material, such as neoprene, a polymer of ethylene, co-polymers of ethylene and propylene, or an EPDM compound. By process of experimentation, it has been determined that an especially advantageous compound for use in forming crosshead 14 has the following material specification:

SAE 2BA815A14C12Z1 where,
2BA—Ethylene Propylene
8—80 Durometer (Hardness)
15—Tensile 1500 psi
A14—Heat Resistance
C12—Ozone Resistance
Z1—Tear Die C at 200

This material is extremely durable, resistant to sun and weather, and is resilient enough to withstand impact without breaking.

It is preferred to make crosshead 14 as wide as possible, as measured along transverse axis 16, since the conciencious golfer will often groom a relatively large portion of the sand trap area. Due to the resilience of the material used to form crosshead 14, this preferred embodiment has a stiffening insert 18 embedded within crosshead 14 extending along transverse axis 16. The stiffening insert may be formed of a number of materials, including metals and non-metals. For example, a metal spring wound from an appropriately sized wire could provide the proper combination of reinforcement and flexibility. However, as noted earlier, a non-metal construction offers advantages which include overall durability, weight, production costs and safety. Accordingly, a non-metal insert is preferred and, in the embodiment shown in FIGS. 2-4, insert 18 is also formed from a resilient, elastomeric material. However, the preferred material forming insert 18 differs from that which forms crosshead 14 (i.e., the material from which insert 18 is formed is relatively rigid when compared to the material from which crosshead 14 is formed). In the preferred embodiment shown in FIG. 2, insert 18 is embedded within crosshead 14 and is formed of nylon. An especially preferred nylon insert material has the following specification:

Zytel ST 801 HS Nylon where,
ST—Super Tough
HS—Heat Stabilized

While nylon insert 18 imparts enough rigidity to crosshead 14 to enable its use as a rake, a degree of resilience and flexibility sufficient to avoid breaking and bending under conditions of normal use and abnormal abuse is maintained through the use of this combination of materials.

Extending downwardly, as pictured in FIG. 2, from the lower-edge of crosshead 14 are a plurality of tines 20 which are integrally molded from the resilient, elastomeric material which forms the crosshead. In the preferred embodiment, resilient tines 20 are formed with a thickened portion 22 near the edge of crosshead 14. Thickened portion 22 tapers to an area, generally indicated by reference numeral 24 in FIG. 2, from which the cross-section of the tines becomes generally uniform and preferably circular. The resilience of each individual tine is determined by the cross-sectional diameter and length of the tine. In a preferred embodiment, each tine has a cross-sectional diameter of approximately $\frac{1}{4}$ to $\frac{1}{2}$ inch and the circular portion of the tine is approximately 1-$\frac{1}{4}$ to 1-$\frac{1}{2}$ inches long. In this preferred embodiment, a force acting on distal end 26 of an individual tine will cause the resilient tine to bend at approximately the area indicated by reference numeral 24. However, the resilient nature of the tine will prevent it from breaking.

Since the individual tines are relatively resilient, a plurality of tines must be provided so that the forces imparted by the user while raking are distributed over a number of tines, none of which are sufficiently stressed to cause undue bending or flexing. In the preferred embodiment shown in FIG. 2, thirteen tines are provided. These tines are evenly spaced along crosshead 14 which has a preferred width of seventeen inches.

Crosshead 14 is also provided with a blade-shaped edge 28 extending tranversely along the width of crosshead 14 and in a generally upward and outward direction, as viewed in FIG. 2. Edge 28 can be used for smoothing purposes or for plowing large amounts of material into a hole. Edge 28 can also be used as a 'squeegee' to scrap water from puddles on the greens and other areas. Edge 28 is also integrally formed from the material of crosshead 14 and can be more or less flexible depending upon the thickness of the material provided along the cross-section.

FIG. 3 shows a sectional view of crosshead 14 along section line AA of FIG. 2. The sectional view of FIG. 3 illustrates the integral nature of crosshead 14, tines 20 and blade-shaped edge 28, as well as the relative position of stiffening insert 18 within the crosshead.

FIG. 4 shows a sectional view of crosshead 14 taken along section Line BB of FIG. 2. FIG. 4 illustrates a preferred method of attaching crosshead 14 to handle portion 12. The preferred method includes formation of a cylindrical socket 30 from the resilient, elastomeric material of crosshead 14. Socket 30 extends at an angle α, as measured from a centerline of tine 20 in a counterclockwise direction as viewed in FIG. 4. Angle α is preferably greater than 90° to reduce the amount of bending required by the user when using the rake. As further illustrated in FIG. 4, socket 30 extends at an angle β, as measured from blade-shaped edge 28 in a clockwise direction as viewed in FIG. 4. In the preferred embodiment angle β is also preferably greater than 90°. In this arrangement, the handle of a rake left on the ground with the tines upturned (i.e., blade-edge 28 and handle portion 12 in contact with the ground) will be prevented from flying upward when the tines are accidentally stepped on, as is known to happen with other types of rakes.

As further illustrated in FIG. 4, a smaller socket 32 is integrally formed in nylon insert 18 and extends coaxially with socket 30. However, socket 32 does not extend all the way to the end of socket 30 and a portion 34 of socket 30 is left open to accept a wedge-nut 36. An end portion 38 of nylon insert socket 32 may also be specially formed to receive a portion of wedge-nut 36 when the rake is in its fully assembled condition, as will be further described below.

In addition to sockets 30 and 32, and wedge-nut 36, the preferred method of attaching crosshead 14 to handle portion 12 includes a threaded bolt 40 and a washer 42. Threaded bolt 40 may be provided with a hex head for tightening by means of a wrench, or, alternatively, with a knurled head 44 to allow for assembly by hand.

To assemble the rake, wedge-nut 36 is inserted into portion 34 of socket 30 and threaded onto bolt 40 until portion 34 of socket 30 begins to expand. At this point, socket 30 is inserted into the hollow end of handle portion 12 until an end 46 of the handle abutts shoulder 48 formed on crosshead 14 at the base of socket 30. Threaded bolt 40 is then tightened, drawing wedge-nut 36 further into socket 30. The tapered cross-section of wedge-nut 36 expands portion 34 of socket 30 against an inner wall 50 of handle portion 12. Bolt 40 is tightened until the crosshead is firmly affixed to the handle. In the preferred embodiment shown, a shoulder 52 is provided in portion 38 of socket 32 to act as a stop for wedge-nut 36. This prevents wedge-nut 36 from being drawn too deeply into socket 30 by an overtightening of bolt 40 which might otherwise cause the hollow end of handle portion 12 to crack or split. It should be noted that, in the event the end of handle portion 12 does split, a speedy repair can be made by simply trimming off the split portion, or alternatively, turning the handle around, and re-attaching the crosshead to the newly exposed hollow end.

As noted earlier, handle portion 12 is preferably formed of a non-metallic material such as fiberglass. A plastic or rubber cap 54 may be provided for the top end of the handle.

With the exception of bolt 40 and wedge-nut 36, the preferred embodiment of the rake is completely non-metallic in construction. Bolt 40 and wedge-nut 36 could, of course, be formed of a non-metallic material, such as a hard nylon.

The combination of material and design features described offers a number of advantages relating to durability, safety, and ease of use. While a preferred and particularly advantageous embodiment of the rake has been described in detail, it should be clearly understood that this description is intended by way of example only and not by way of limitation. Numerous design changes (including modification of the dimensions noted or specification of materials having the same general characteristics and properties as those described) can be made while still remaining within the spirit and scope of the present invention. Accordingly, the invention is to be limited only by the terms of the following claims.

We claim:

1. A rake head for a raking implement, comprising:
    a crosshead formed from a resilient, elastomeric material;
    a plurality of tines extending from the crosshead, said tines being integrally formed with the crosshead from said resilient, elastomeric material; and
    resilient stiffening means for increasing the rigidity of the resilient crosshead along a transverse axis thereof so as to allow the crosshead to return to its original shape after flexure.

2. A rake head according to claim 1, further comprising a blade-shaped edge extending along the crosshead, said edge being integrally formed with the crosshead from the resilient, elastomeric material.

3. A rake head according to claim 1, wherein said resilient, elastomeric material comprises a copolymer of ethylene and propylene.

4. A rake head according to claim 1, wherein said resilient, elastomeric material comprises an EPDM compound having a Durometer hardness of approximately 80 and a tensile rating of approximately 1500 PSI.

5. A rake head according to claim 1, wherein said crosshead, as measured along said transverse axis, is approximately 17 inches wide.

6. A rake head according to claim 1, wherein said tines are evenly spaced along a common edge of said crosshead.

7. A rake head according to claim 1, wherein at least a portion of each tine is generally circular in cross-section and has a cross-sectional diameter of approximately $\frac{1}{4}$ to $\frac{1}{2}$ inch, and wherein said circular portion is approximately $1\frac{1}{4}$ to $1\frac{1}{2}$ inches in length.

8. A rake head according to claim 1, wherein said stiffening means is embedded in the resilient, elastomeric crosshead.

9. A rake head according to claim 1, wherein said stiffening means is an elastomeric insert embedded in the resilient, elastomeric crosshead.

10. A rake head according to claim 9, wherein said elastomeric insert is a nylon insert.

11. A rake head according to claim 9, wherein said elastomeric insert has a melting point above that of said resilient, elastomeric material which forms the crosshead.

12. A raking implement, especially well-suited for use as a sand trap rake, comprising:
    a crosshead formed from a resilient, elastomeric material;
    a plurality of tines extending from the crosshead, said tines being integrally formed with the crosshead from said resilient elastomeric material;
    resilient stiffening means for increasing the rigidity of the resilient crosshead along a transverse axis thereof so as to allow the crosshead to return to its original shape after flexure;
    a handle; and
    means for attaching the handle to the crosshead.

13. A raking implement according to claim 12, further comprising a blade-shaped edge extending along the crosshead, said edge being integrally formed with the crosshead from the resilient, elastomeric material.

14. A raking implement according to claim 12, wherein said resilient, elastomeric material comprises a copolymer of ethylene and propylene.

15. A raking implement according to claim 12, wherein said resilient, elastomeric material comprises an EPDM compound having a Durometer hardness of approximately 80 and a tensile rating of approximately 1500 PSI.

16. A raking implement according to claim 12, wherein said crosshead as measured along said transverse axis, is approximately 17 inches wide.

17. A raking implement according to claim 12, wherein said tines are evenly spaced along a common edge of said crosshead.

18. A raking implement according to claim 12, wherein at least a portion of each tine is generally circular in cross section and has a cross-sectional diameter of approximately ¼ to ½ inch, and wherein said circular portion is approximately 1¼ to 1½ inches in length.

19. A raking implement according to claim 12, wherein said stiffening means is embedded in the resilient, elastomeric crosshead.

20. A raking implement according to claim 12, wherein said stiffening means is an elastomeric insert embedded in the resilient, elastomeric crosshead.

21. A raking implement according to claim 20, wherein said elastomeric insert is a nylon insert.

22. A raking implement according to claim 12, wherein said handle is a hollow tube formed of a non-metallic material.

23. A raking implement according to claim 22, wherein said non-metallic material is fiberglass.

24. A raking implement according to claim 12, wherein said means for attaching the handle to the crosshead includes a socket integrally formed with the resilient crosshead for insertion into a hollow end of the handle, and means for expanding said socket against an inner wall surface of the handle.

25. A raking implement according to claim 24, wherein said means for expanding said socket includes a threaded bolt and a wedge nut.

26. A raking implement according to claim 25, whereon said means for attaching the handle to the crosshead further includes stop means, formed in said stiffening means, for preventing the wedge nut from over expanding said socket.

27. A raking implement according to claim 24, wherein said socket extends from the crosshead at an angle $\alpha$, as measured in a counter-clockwise direction from a centerline of the tines, and at an angle $\beta$, as measured in a clockwise direction from a blade-shaped edge extending along the crosshead, and wherein both angles $\alpha$ and $\beta$ are greater than 90 degrees.

28. A rake head according to claim 2, wherein said resilient, elastomeric material comprises a copolymer of ethylene and propylene, and wherein said resilient stiffening means comprises an elastomeric insert embedded in the resilient, elastomeric crosshead.

* * * * *